United States Patent [19]

Sygnator

[11] Patent Number: 4,532,663
[45] Date of Patent: Aug. 6, 1985

[54] METHOD OF MANUFACTURING A DRILL SCREW

[75] Inventor: Henry A. Sygnator, Arlington Heights, Ill.

[73] Assignee: Illinois Tool Works Inc., Chicago, Ill.

[21] Appl. No.: 513,582

[22] Filed: Jul. 14, 1983

Related U.S. Application Data

[62] Division of Ser. No. 279,103, Jun. 30, 1981, Pat. No. 4,395,173.

[51] Int. Cl.³ .......................... B23G 9/00; B21K 1/56
[52] U.S. Cl. .................................................... 10/10 R
[58] Field of Search ................. 10/9, 10 R, 21, 27 R; 408/230; 411/386, 387, 417, 418, 420, 421, 902

[56] References Cited

U.S. PATENT DOCUMENTS

| | | | |
|---|---|---|---|
| 3,738,218 | 6/1973 | Gutshall | 10/10 R X |
| 3,780,389 | 12/1973 | Lindstrom | 10/10 R |
| 3,933,075 | 1/1976 | Peterson | 10/10 R X |
| 4,138,754 | 2/1979 | Baer | 10/9 X |

FOREIGN PATENT DOCUMENTS 26071 of 1913 United Kingdom ................ 411/902

Primary Examiner—E. Michael Combs
Attorney, Agent, or Firm—David I. Roche; T. W. Buckman

[57] ABSTRACT

A drill screw having protective burrs on the cutting edges. These burrs preserve the sharpness of the cutting edges against heavy plating buildup which can have detrimental effects on performance. Further, whereas conventional burrs on the drag surfaces can be reinforced and serve to thicken the dimension of the point across the chisel, the burrs of the present invention are formed on the cutting edge in such a way that they are spaced from the chisel. Drilling can, therefore, begin immediately and continued penetration of the workpiece pushes the burrs into the material being drilled causing them to break off.

5 Claims, 7 Drawing Figures

METHOD OF MANUFACTURING A DRILL SCREW

This is a division of application Ser. No. 279,103, filed June 30, 1981 U.S. Pat. No. 4,395,173.

BACKGROUND AND SUMMARY OF THE INVENTION

The present invention is directed to an improved drill screw. More particularly, the present invention is directed to a drill screw, and a method for making same, which screw has a pair of burrs formed along the cutting edges to protect them.

The present invention resulted during the manufacture of the screws shown in, and is related to the invention disclosed and claimed in, U.S. patent application Ser. No. 97,460 filed Nov. 26, 1979. Further, while tests indicate improved performance with other screw configurations, performance data indicate the most significant improvements occur with the configuration disclosed in the abovenoted application which disclosure is hereby incorporated by reference. For these reasons, the present invention is shown and described in terms of this particular configuration.

The conventional manner of manufacturing drill screws involves heading a screw blank, forming the flutes in the screw shank, and then pointing. The pointing step involves the use of pointing saws or cutters used to mill the end of the shank to form two terminal end portions whose intersection defines a chisel. The cutters are rotated in a direction to move material away from the cutting edge of one flute and toward the trailing or drag edge of the other. On some milling machines this results in a burr extending along this drag edge. This burr originates at the chisel and extends outwardly to the periphery of the shank.

For many standard platings, chloride-zinc for example, this burr presents no significant problem; the burr merely snaps off as drilling starts. But, for the heavier platings such as nickel or the multiple-coating platings, this burr becomes reinforced and the plating builds a deposit on the cutting edge producing two adverse results. First, the plated, reinforced burr resists snapping off since it enjoys a "protected" position in the drag region of the flute. This adds to the thickness of the screw in the chisel region and prevents the rapid penetration for which the screw was designed. In fact, if the build-up burr significantly increases the chisel dimension, the screw will spin rather than drill, creating heat which causes the point to break down. Second, the buildup on the cutting edge results in a lack of sharpness which detrimentally effects drilling.

The present invention solves the abovementioned problems by relocating the burr to a position along the cutting edge. Surprisingly, this does not merely form larger blobs on the cutting edges further degrading performance. Rather, the burrs protect the cutting edges from excess plating buildup. Because of the angular relationships of the cutters, the burrs are pushed away from the chisel region. This enables the drill screw to penetrate quickly and the plated burrs snap off as drilling continues and they are forced into the drilled material.

Other features, characteristics and advantages of the present invention will become apparent after a reading of the following specification.

DETAILED DESCRIPTION OF THE PREFERRED EMBDDIMENTS

As previously noted, the protective burrs are particularly effective with the drill screw described and claimed in U.S. applicaton Ser. No. 97,460 (hereinafter the previous application). The drill screw of the previous application is shown generally at 10. The shank of the screw has a drill tip 12 and a threaded region 14. Drill tip 12 has first and second flutes 16 and 18, respectively. Head 20 has surfaces 22 to receive drive torque, said surfaces being depicted here as sides of a hex washer head. Other drive means including internal recesses can, of course, be used.

Figure 1:
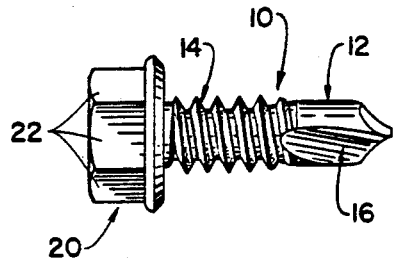
FIG. 1 is a side elevation of the screw described and claimed in U.S. application Ser. No. 97,460.
Figure 2:
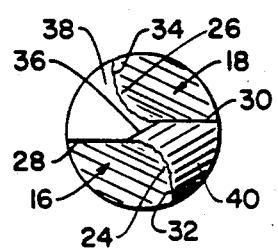
FIG. 2 is an enlarged end view of the screw showing the conventional burr.

FIG. 2 shows the conventional burrs 24 and 26 formed along drag edges 32 and 34 adjacent first and second cutting edges 28 and 30. These cutting and drag edges are formed by the intersections of flutes 16 and 18 with first and second terminal end portions 38 and 40. Burrs 24 and 26 are formed during the pointing operations depicted in FIG. 7.

Figure 6:
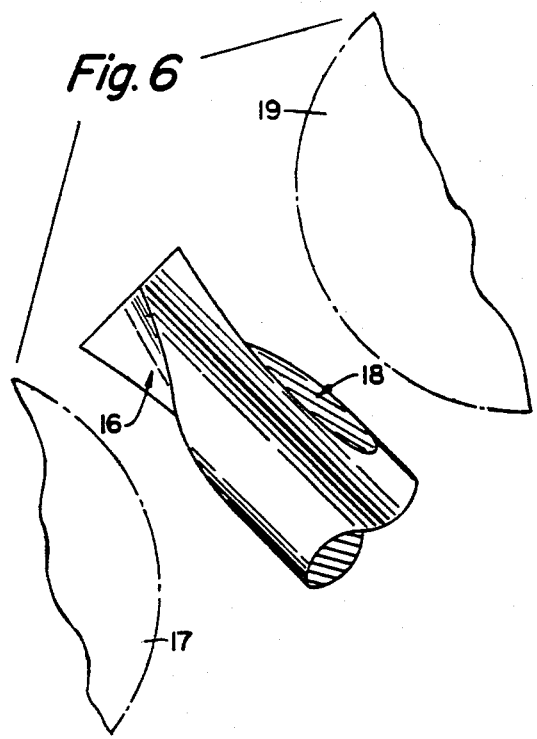
FIG. 6 depicts schematically the fluting step of the method of the present invention.

In manufacturing screw 10, the blank is first headed in any commercially available header, a two-blow header, for example. Then as schematically depicted in FIG. 6, the flutes 16 and 18 are formed in the end of the blank. Any method of flute formation may be used but preferably the two flutes are milled by cutters 17 and 19. Milling is preferred to forging because milling produces a higher quality cutting edge than can be made by forging.

Figure 7:
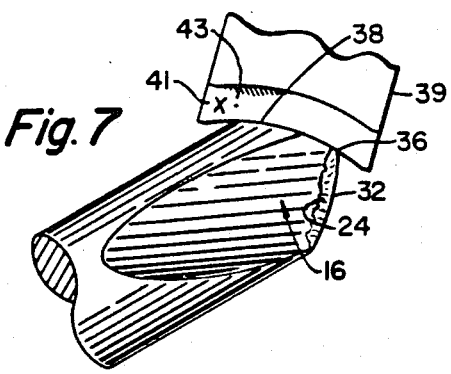
FIG. 7 shows the formation of the second terminal end portion during the second pointing step of the present method.

As seen in FIG. 7, conventional burr 24 has been formed in flute 16 along drag edge 32 and burr 26 is being formed in flute 18 by rotating the radiused cutter 39 in the direction indicated by arrow tail 41. These burrs extend from chisel 36 along the entire drag edges. This has the effect of increasing the dimension of the width across the chisel. As noted, for some platings these burrs 24 and 26 remain brittle and break off easily during installation. Further, for lighter platings such as chloride-zinc there is no appreciable buildup of the plating along cutting edges 28 and 30.

These burrs 24 and 26 become a problem, however, when the application for which the screw is to be used requires a heavier plating. Reinforced with such heavy plating, these burrs are no longer brittle. The burrs effectively increase the dimension across the point which, in turn increases the time it takes for the screw to achieve initial penetration into the workpiece. As the screw spins on the surface of the material it generates large amounts of heat, sufficient heat to cause the screw to melt or become welded to the workpiece. The buildup of the plating on the cutting edges blunts their sharpness further aggrevating the situation and leading to some parts failure to drill.

Figure 3:
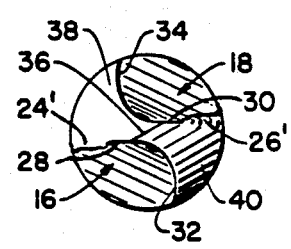
FIG. 3 is an enlarged end view similar to FIG. 2 but having the reverse burr of the present invention.
Figure 4:
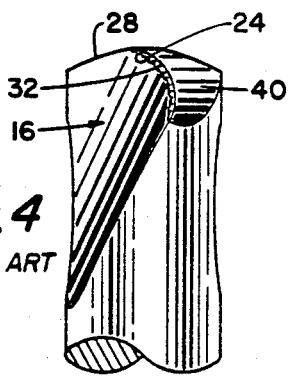
FIG. 4 is an enlarged side elevational view of the conventional burr.
Figure 5:
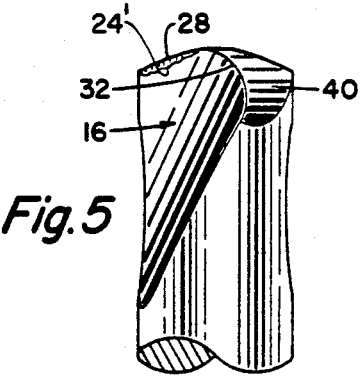
FIG. 5 is an enlarged side elevational view similar to FIG. 4 but having the reverse burr.

In forming burrs 24' and 26' of the present invention, the cutters are rotated in the opposite rotational direction, in the case of cutter 39 in the direction of arrow point 43 (FIG. 7). As best seen in FIGS. 3 and 5, burrs 24' and 26' are formed along cutting edges 28 and 30. These burrs are spaced somewhat from chisel 36. This is a result of the angularity of the pointing cutters relative to flutes 16 and 18 (i.e., the cutter rotational axes are perpendicular to chisel 36). Hence, the material which is being removed in forming the reverse burrs (so called, because of the reverse rotational direction for the cutters) is being pushed laterally away from chisel 36 rather than toward it.

When these parts are coated with heavier platings, the buildup occurs on burrs 24' and 26' and not on cutting edges 28 and 30. Since the dimension across the chisel has not been increased, drilling begins immediately. As penetration of the workpiece continues, the reinforced burrs 24' and 26' are pushed against the workpiece material and break off, regardless of the amount of reinforcement. Alternatively, if appearance of the product were important, these burrs could be broken off after plating using a brush or the like, in an additional manufacturing step.

Various changes, modifications and alternatives will become apparent to persons of ordinary skill in the art after a reading of the following specification. Accordingly, it is intended that all such changes, modifications and alternatives as come within the scope of the appended claims be considered part of the present invention.

I claim:

1. A method of manufacturing a drill screw having a pair of oppositely disposed flutes and a pair of oppositely disposed terminal end surfaces, said end surfaces intersecting to form a chisel, each end surface being bounded by a drag edge and a cutting edge, said method comprising the steps of heading a first end of a screw blank; forming two flutes in a second end of said screw blank; milling a first terminal end surface on said second end by rotating peripheral teeth of a milling cutter in a direction from a first drag edge toward a first cutting edge formed at the intersection of a first of said two flutes and said first terminal end surface; milling a second terminal end surface on said second end by rotating peripheral teeth of a milling cutter in a direction from a second drag edge toward a second cutting edge formed at the intersection of a second of said two flutes with said second terminal end surface; leaving first and second burrs positioned along outer portions of said first and second cutting edges at positions spaced from said chisel; performing subsequent operations on said drill screw.

2. The method of making a drill screw set forth in claim 1 wherein said subsequent operations include application of a heavy metal coating to the drill screw.

3. The method of making a drill screw set forth in claim 1 further including the step of removing the protective burrs at the time of drill screw installation.

4. The method of making a drill screw set forth in claim 1 wherein burr removal is performed in a separate manufacturing step prior to packaging and shipping but subsequent to plating.

5. The method of making a drill screw set forth in claim 1 wherein the flute forming step is performed by milling.

* * * * *